July 15, 1924.
E. E. LAWRENCE
1,501,285
MECHANISM FOR CONVEYING AND STACKING FOOD PRODUCTS
Filed May 19, 1922
4 Sheets-Sheet 4
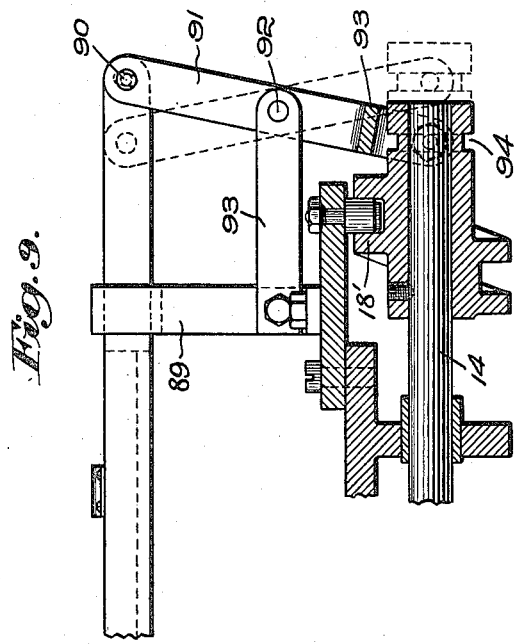
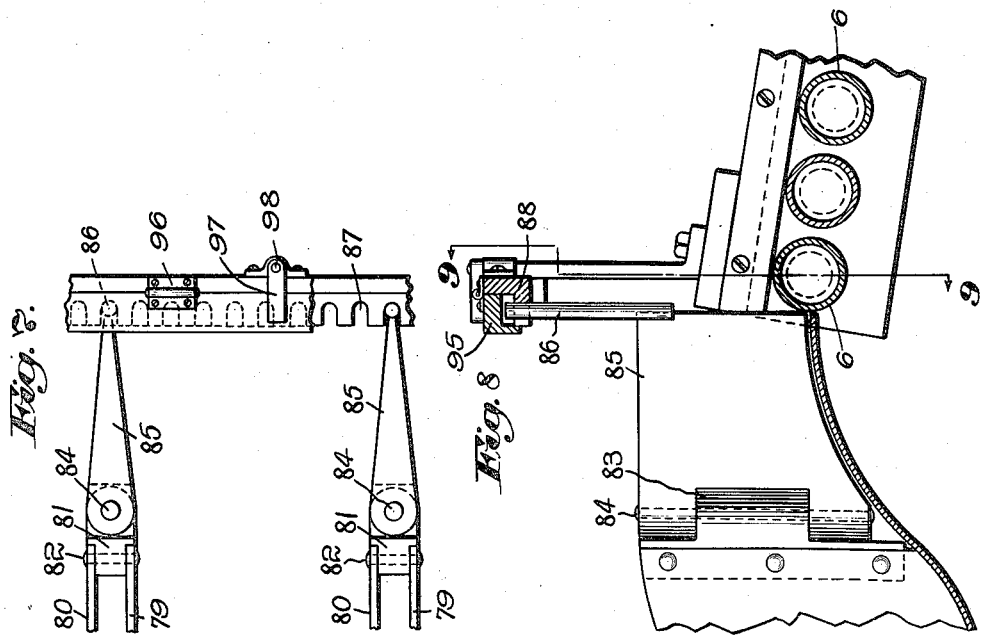
Inventor:
Edward E. Lawrence
by Emery Booth Janney & Varney
Attys.

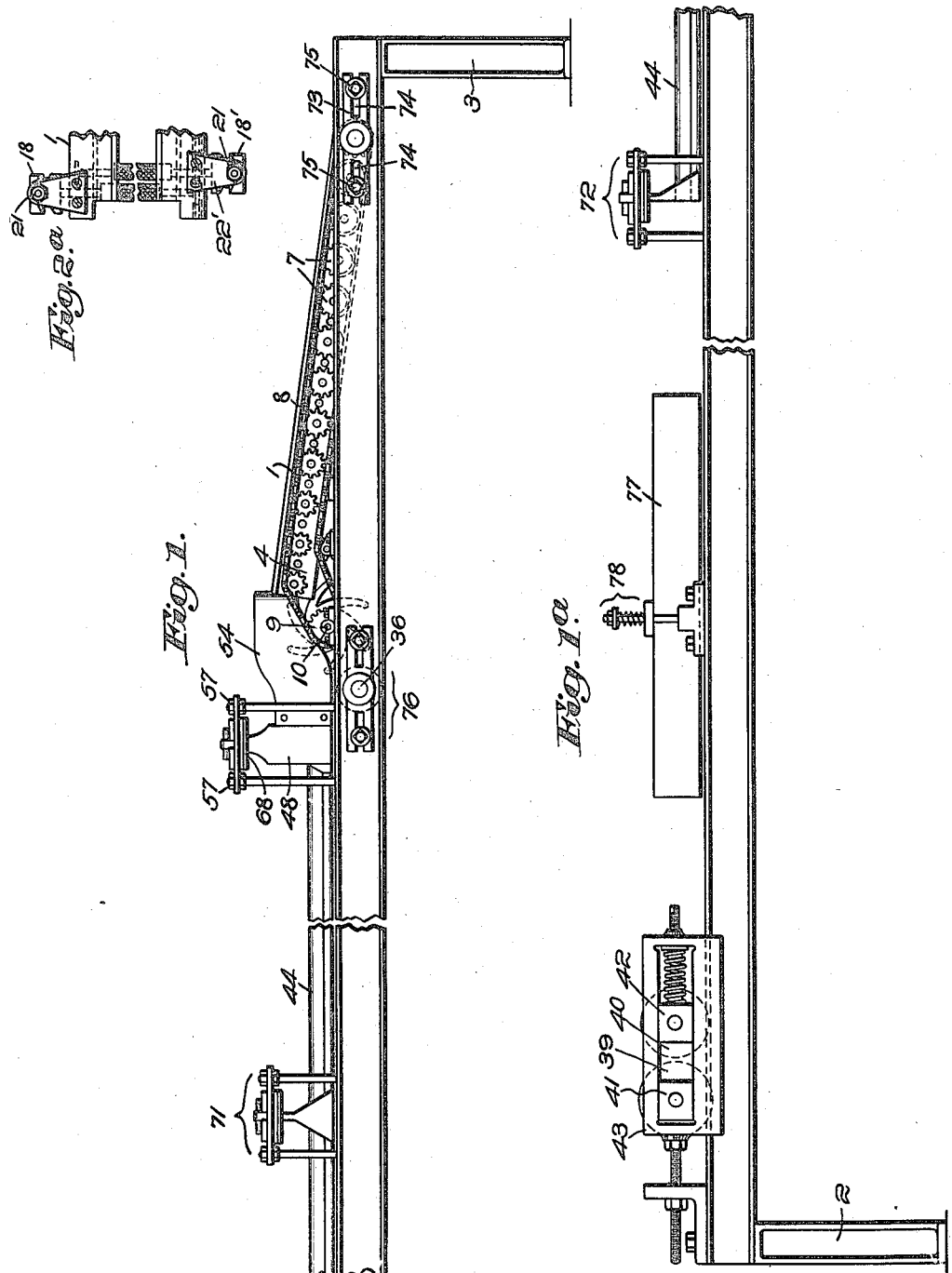

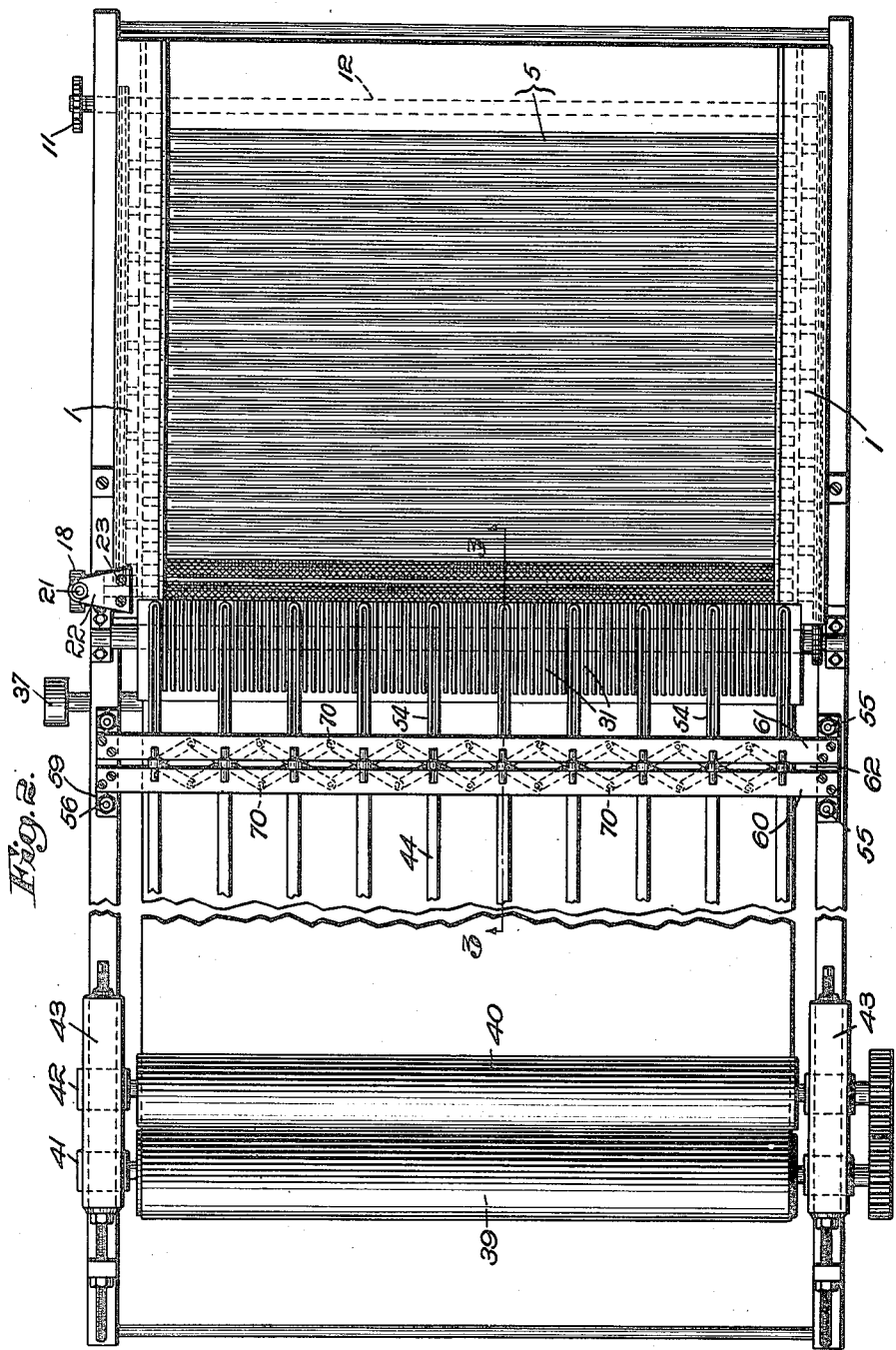

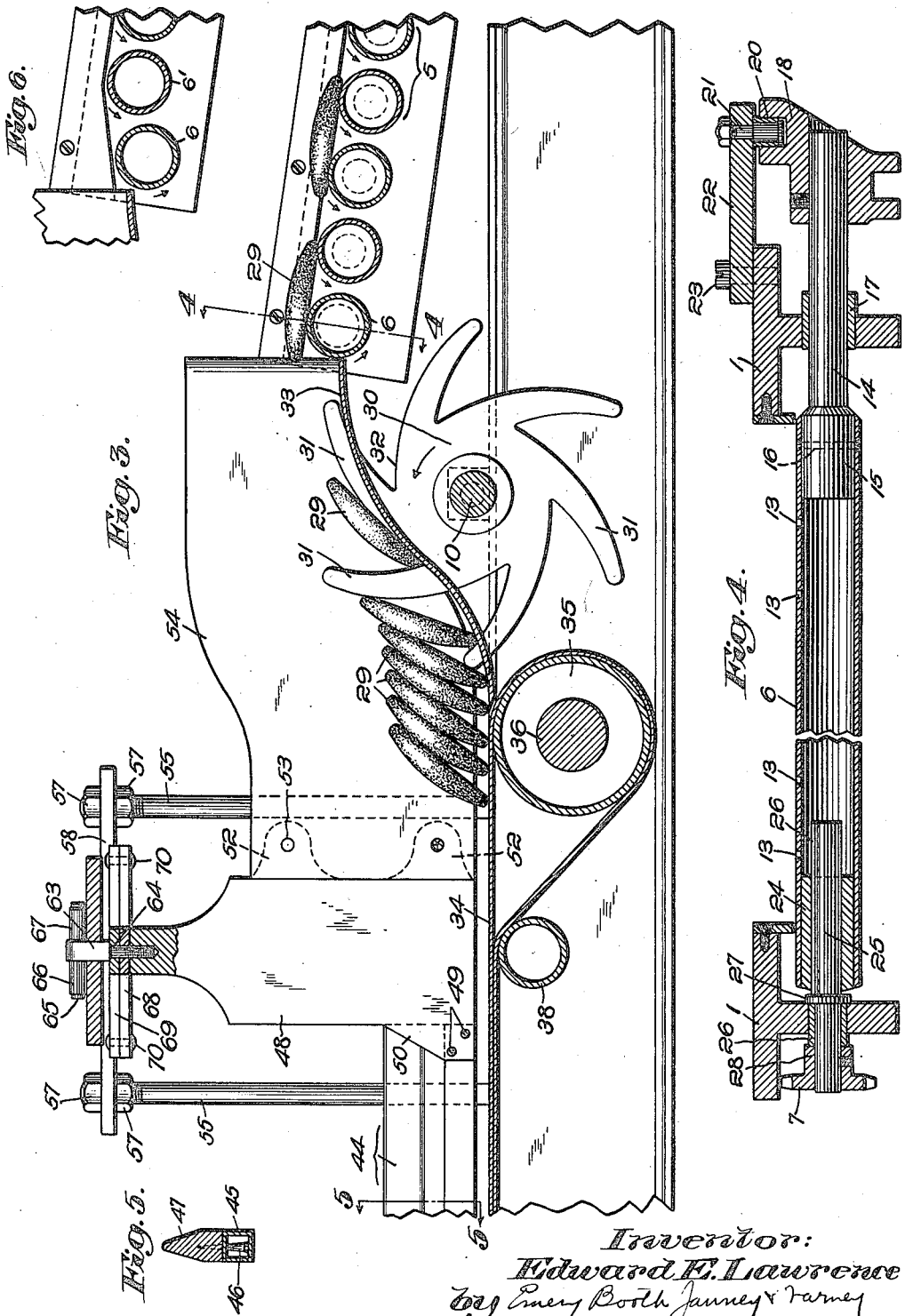

Patented July 15, 1924.

1,501,285

UNITED STATES PATENT OFFICE.

EDWARD E. LAWRENCE, OF JAMAICA, NEW YORK, ASSIGNOR TO LOOSE WILES BISCUIT COMPANY, OF LONG ISLAND CITY, NEW YORK, A CORPORATION OF NEW YORK.

MECHANISM FOR CONVEYING AND STACKING FOOD PRODUCTS.

Application filed May 19, 1922. Serial No. 562,244.

*To all whom it may concern:*

Be it known that I, EDWARD E. LAWRENCE, a citizen of the United States, and a resident of Jamaica, in the county of Queens and State of New York, have invented an Improvement in Mechanism for Conveying and Stacking Food Products, of which the following description, in connection with the accompanying drawings, is a specification, like characters on the drawings representing like parts.

This invention relates to mechanism for conveying and stacking flat articles, such, for example, as food products of disk like form. In order that the invention may be readily understood, I have disclosed a single embodiment thereof in the accompanying drawings, wherein—

Fig. 1 is a side elevation of the right hand end of a conveying and stacking mechanism embodying my invention;

Fig. 1ª is a similar view of the left hand end thereof;

Fig. 2 is a plan view, with the intermediate portion broken away, of the mechanism shown in Figs. 1 and 1ª;

Fig. 2ª is a detail in plan, with parts broken away, of a modification of a portion of the mechanism;

Fig. 3 is a vertical longitudinal section on the line 3—3 of Fig. 2 of a portion of the mechanism shown in Figs. 1 and 1ª;

Fig. 4 is a cross sectional view taken through the uppermost of the series of rolls shown in Fig. 3 on the line 4—4 of said figure;

Fig. 5 is a detail in vertical section upon the line 5—5 of Fig. 3;

Fig. 6 is a detail in longitudinal section of a modification;

Fig. 7 is a detail in plan view of a slightly modified form or part of my invention;

Fig. 8 is a side elevation thereof with parts in vertical section; and

Fig. 9 is a view, partly in side elevation and partly in vertical section, of one form of means for operating the swinging or rudder like members shown in Figs. 7 and 8.

Means have heretofore been provided to convey and to stack flat articles, such, for example, as certain food products, but without entire success. I have provided improved means for conveying and for stacking flat articles, such, for example, as disk-like food products generally termed crackers, biscuits, cookies, etc. I will proceed to describe that embodiment herein shown without restricting myself thereto and without limiting the invention to use upon any particular product.

It is desirable that articles such as disk-like food products be assembled or stacked in rows face to back so that the operatives can readily take from the stacks or rows sufficient articles to fill a carton or receptacle usually of the width and depth of a cracker or like product and of a length sufficient to receive or accommodate a stack of substantial length. In satisfactorily stacking crackers or like food products, it is important that they all face the same way, that is, that they be face to back and that the stacks or rows of the assembled crackers or other articles be accurately arranged in face to back relation so that a sufficient number constituting a stack to fill a single carton, may be quickly taken by the operator or by suitable mechanism from a row and inserted with a minimum expenditure of time into the carton or receptacle.

The mechanism herein disclosed constitutes the preferred embodiment of the invention and accomplishes effectively the desired result hereinbefore specified. Referring more particularly to the drawings, it is to be noted that the cakes or other food products may if desired be mechanically conveyed in any suitable manner to the actual stacking or assembling part of the apparatus, or if desired the articles may first be placed in or upon pans and discharged manually from the pans all with the face up or down onto traveling mechanism.

Either procedure may be employed so far as the invention herein disclosed is concerned.

In the drawings, the framing of the machine is indicated generally at 1, 2, 3, it being herein shown as consisting of suitable metallic bars or members arranged in a generally rectangular or oblong manner and supported upon suitable uprights. The framing may, however, be of any suitable construction, and I may provide castings instead of certain of the channel irons shown. At the infeeding end of the machine, that is, at the right hand end thereof viewing Fig. 1, I provide opposite inclined members, one of which is indicated at 4, and secured to the main framing 1 at the proper angle. Upon said members 4 I mount a series of rolls indicated generally at 5, the last of said rolls being indicated at 6. The said rolls are adapted to be driven in a forward direction and preferably at an increasing speed, so that the cakes or other articles deposited thereon are automatically spread or separated as they are fed forward up the incline constituted by said rolls. In order so to drive the rolls any suitable means may be provided. Desirably, however, I provide sprockets upon the ends of said rolls, the first, third, fifth, etc. sprockets being at one end of the corresponding rolls and the second, fourth, sixth, etc., pinions being at the opposite end thereof because of the preferably close spacing of the rolls which as shown in Fig. 2 are so closely spaced as not to permit the cakes or the like to drop between the rolls. The pinions at one end are indicated at 7 and, as indicated in Fig. 1, they have a successively decreasing number of teeth which are engaged by a sprocket chain 8 passing about all of said sprockets and also about a sprocket 9 on a shaft 10 whereon is mounted certain stacker members hereinafter referred to. Thus the rolls are driven at a gradually increasing speed. Power is applied to the said sprocket chains in any suitable manner and preferably by a pinion 11 upon the shaft 12 of the first roll of the series. The pinion 11 is driven from any suitable source of power, such for example as an electric motor. The said rolls 5 may be smooth surfaced or they may be somewhat roughened. In either case the last two rolls of the series are desirably knurled.

I have stated that the entire series of rolls 5 is forwardly driven. In addition, I preferably impart a to and fro axial motion to the last roll 6 of the series as indicated in Figs. 3 and 4, or if desired, to a plurality of the last rolls as in the modified form of my invention shown in Fig. 6. I will first describe that form of the invention shown in Figs. 3 and 4, it being noted that in said form, the rolls are shown as arranged in a straight incline, the last roll 6 of the series being at the highest elevation. My invention is not limited to such arrangement as I may position the last roll or a plurality of the last rolls somewhat lower than the immediately preceding rolls, as indicated in that modified form of my invention shown in Fig. 6.

In order to impart an endwise or to and fro axial motion to the last roll 6 in Fig. 4, I may provide any suitable mechanism. Herein for the purpose I have represented said roll 6 as hollow and as having a suitable number of holes 13 in its periphery to permit the escape of air. Fast upon one end of said roll 6 is a short stud 14 having a head 15 secured by a pin 16 in the end of the said hollow roll 6. The stud 14 is mounted to slide in a suitable bearing 17 in the framing 1 and said stud has fast upon its end a cam 18 having a cam way or track 19 which receives a roll 20 mounted upon a bolt 21 in a bracket 22 secured by screw or bolt 23 to the frame. At its opposite end the roll 6 is provided with a bushing 24 receiving a shaft 25 having a feather or key 26 thereon entering a keyway in the bushing 24 so that the roll 6 is driven by rotation of the shaft 25. In order to drive the shaft 25 there is fast upon the end thereof one of the pinions 7 previously referred to, the shaft 25 being supported in a suitable bearing 26 in the frame 1 and held from longitudinal movement by a collar 27 and by the hub 28 of the pinion 7.

It will be understood that by reason of the foregoing construction the shaft 6 is rotated in a forward direction, thus constantly rotating the cam 18, the cam shaft 19 whereof compels a to and fro axial movement of the hollow roll 6. The purpose of imparting a to and fro axial motion to the roll 6 is to prevent the cakes that in their onward movement strike the partitions directing them into the stacking mechanism proper, from remaining in contact with the ends of said partitions. The to and fro movement of the roll 6 causes said cakes to move to one side or the other of the end of the partition with which it is or may be contacting, so that as indicated in Fig. 3, the cake or other article is delivered by the rotary motion of the roll 6 between the partitions. In this action the knurled or otherwise roughened surface of the roll 6 effectively cooperates.

If desired I may as already stated impart to and fro axial movement to a plurality of the last rolls of the series, and in Fig. 2ª I have indicated a cam 18 fast upon the end of the last roll 6 and a cam 18′ fast upon the next to the last roll, so as to receive a stud 21′ upon a bracket 22′. The cams 18, 18′ are so positioned upon their respective rolls that they impart to and fro axial movement to said rolls in opposite phase. The result is that cakes or other articles resting upon the last two rolls are moved some to the right and some to the left, depending upon whether their weight is received more directly upon the last roll or the next to the last roll. Desirably but not necessarily, when the last two rolls of the series or some other number of the last rolls are thus moved axially, the said rolls so movable are arranged at a downward incline as indicated in Fig. 6, wherein the last roll 6 is indicated as at a slightly lower level than the next to the last roll there indicated at 6'. If desired, the oscillated rolls may be horizontally arranged instead of at a downward incline, or they may be upwardly arranged as in the construction disclosed in Figs. 1 and 3.

The cakes or other articles indicated at 29 are discharged from the last roll 6 to the stacking mechanism proper and which desirably is composed of the following organization of parts to which, however, my invention is not limited. Fast upon the shaft 10 are a series of disk-like members 30 each having somewhat the shape of a star wheel, but with their teeth or projections 31 arranged in a non-radial curved relation, as clearly indicated in Fig. 3. As shown, the base 32 of the longer edge of each tooth is almost tangential to the hub of the member 30. While other forms may be employed, I have obtained the best results by the disclosed construction and as clearly indicated in Fig. 3, the cakes 29 are received preferably separately but sometimes in groups of two or three between adjacent teeth or projections 31. All of the members 30 are positively rotated by the sprocket chain 8 at one end of the machine, or if desired the shaft 10 may be driven from both ends. The size of the star wheels or members 30 and of the pinion 9 is such that they rotate at a slower peripheral speed than the rolls 6, so that the cakes 29 are received between the teeth or projections 31 thereof and are discharged onward in a stacked relation as clearly indicated in Fig. 3.

The shaft 10 is so located that the teeth or projections 31 of the star wheels or members 30 pass through longitudinally extending slots in a stripper plate 33 which is of such form as to guide the cakes 29 gradually downward or to permit their downward movement while held between the teeth or projections 31, so that at the lower end of said grid or guide the cakes 29 are delivered directly onto the upper run of a wide belt 34 which as indicated in Figs. 1ª, 2 and 3, passes about a drum 35 fast upon a shaft 36 and driven in any suitable manner as from a pulley 37 indicated in Fig. 2, from some suitable source of power. The lower run of said apron is supported by a guide roll 38 near the drum 35 and if desired by other guide rolls and said apron passes about a roll 39 at the opposite end of the framing and is held against said roll by a companion roll 40. The said rolls 39 and 40 are mounted in suitable bearings 41, 42 in boxes or supports 43 at opposite sides of the frame, the said bearings being adjustably and yieldingly held in operative relation as indicated in Figs. 1ª and 2 or in any other suitable manner.

The apron 34 is preferably driven at a variable speed with reference to the peripheral speed of the teeth or projections 31 of the star wheel 30, so that the cakes or other articles 29 are received and conveyed in the upstanding relation indicated in Fig. 3.

The framing of the machine may be of any suitable dimensions, but preferably it is such as to accommodate an apron 34 of substantial width and rolls 6 of corresponding length so as to provide for a relatively large number of stacks of the cakes or other articles 29. In Fig. 2, I have indicated nine stack ways which are provided with a series of longitudinally extending partitions 44 which, as indicated in Fig. 5, may each be composed of a metallic hollow bar 45 having secured thereto by screws 46 wooden or other strips 47 desirably tapered as indicated. The said strips are desirably secured to and cooperate with means desirably extending from the last roll 6 to said strips 45, 47, so as to separate the cakes or other articles 29 into the proper number of stacks. I will describe the preferred construction for this purpose without limiting myself thereto.

The number of star wheels or members 30 may be varied, but as indicated in Fig. 2 it is desirably largely in excess of the number of strips or partitions 47 with the result that each cake or other product 29 is supported by a plurality of such star wheels or members 30. I desirably provide means whereby the width of the stack ways may be varied, as thus I may accommodate cakes or other articles 29 of the diameter shown or of any other diameter that I may desire to stack by the mechanism herein disclosed. I will describe the adjusting means shown without limiting myself thereto, as obviously other means may be provided for this purpose within the scope of my invention.

At the receiving end of each strip 45, 47, the same are secured to upright preferably metallic plates 48 as by means of screws 49 entering a basal extension on said plates 48. At their right hand edges viewing Fig. 3, each plate 48 is provided with two pairs of ears 51, 52, the upper one of which receives a pivotal pin 53 upon a partition member 54 which as indicated in Fig. 2 is preferably of metal folded into a flattened U form, the right hand end portions of each partition 54 being of gradually reduced width.

At its lower left hand portion viewing Fig. 3 each partition member 54 is provided with means to engage the ears 52 so as to cooperate in holding said members 54 in their active positions, indicated in Fig. 3, but permitting them to be swung upward when access is desired to the star wheels or members 30 or for other purposes. While any suitable construction may be employed I preferably provide holes in alignment in the pairs of ears 52 and punch aligning holes in the lower portion of the partition members 53, the burrs or like formation upon the rims of the holes in the partition members 54 taking into the holes in the ears 52 sufficiently to hold said partition member in proper relation.

Thus it will be apparent that the strips 45, 47, the plates 48 and the partition members 54 are connected together thereby providing a series of parts which can be laterally adjusted in any suitable manner. Desirably for this purpose the following mechanism is provided.

At opposite sides of the framing I provide upright posts or bolts 55, 55, 56, 56, and upon the upper ends thereof between suitable nuts 57 I support plates 58, 59 whereon I secure two preferably metallic bars 60, 61 spaced slightly apart as indicated in Fig. 2, so as to provide a slot or guideway 62 wherein are received the heads 63 of screws 64 positioned in the upper ends of the respective plates 48 as most clearly indicated in Fig. 3. Each head 63 is formed as an eye to receive a cross pin 65 desirably having two rolls 66, 67 thereon which rest upon the upper faces of the bars 60, 61 and in such a manner as to permit them to be moved along the slot 62 when it is desired to adjust the partitions composed of the strips 45, 47, the plates 48 and the partition members 54.

As most clearly indicated in Fig. 2, and also in Fig. 3, each screw 64 passes through two links 68, 69 occupying a face to face relation and constituting members of a lazytong arrangement, the links whereof are pivoted together at their ends by pins 70. The said link 68, 69 are duplicated as indicated in Fig. 2, so that the entire series extends entirely across the belt 34, that is, from the outermost partition at one side to the outermost partition at the opposite side of the mechanism. If desired, the lazytong system may be anchored in a detachable manner at some point, as for example at one end or at the other end so as to prevent any accidental displacement of the system. I prefer to anchor it in the centre.

The described construction for permitting transverse adjustment of the partitions and including the lazytong system is desirably duplicated at other parts of the mechanism as for example at the left hand end of Fig. 1 at 71 and the right hand end of Fig. 1ª at 72. The construction and arrangement of parts are such that by suitably loosening the parts the transverse adjustment of the partition can be effected when it is desired to operate upon cakes or other products of greater or less diameter than those herein indicated.

As indicated in Fig. 1 I provide means whereby the chains 8 may be held taut, such means consisting of a pair of castings 73 at opposite sides of the framing, supporting the bearings for the driving shaft 12 and having suitable slots 74, 74, in which are received adjusting bolts 75, 75. The shaft 36 is provided with similar means for effecting apron-tightening adjustment thereof, such means being indicated generally at 76 in Fig. 1.

If desired, I may provide means whereby any broken crackers or crumbs are not discharged endwise from the apron, but are deflected at the sides of the apron at some suitable point into a receptacle. For this purpose, I have indicated in Fig. 1ª a deflector 77 extending in a general V shape across the apron 34 and held in a yielding manner as indicated at 78.

It will be understood from the foregoing description that the cakes or other food products are positioned upon the series of rolls 5 all face up or face down, in any suitable manner, and that they are fed forward at a gradually increased speed, so that they are separated out and are delivered without clogging between the partition members 54, where they are stacked in a series of stack ways.

I have represented all the partition members 54 as having their right hand ends viewing Figs. 2 and 3 terminating in the same vertical plane. If desired, I may make certain of said partition members, as, for example, alternate ones, longer than those indicated in Figs. 2 and 3, so as to lessen any liability of jamming or wedging the cakes or other articles at the mouth of the passage ways formed by the said partition members. To this end I may attach detachably pieces forming longitudinal continuations of alternate or other partition members 54.

In Figs. 7, 8 and 9, I have shown a slightly modified construction of the partition members 54.

In Figs. 1 and 3, the partition members 54 are shown as extending into close proximity to the roll 6. In Figs. 7 and 8, I have represented said partitions as each formed of vertical pieces of metal 79, 80, or if desired, one piece bent into U form and terminating at their forward ends at a substantial distance from the roller 6. To each of the partition members 79, 80 is secured a block 81, as by means of a bolt 82; and said blocks are so formed as to provide a hinge portion 83, to which is hinged by means of a vertical pintle 54 a movable deflector or rudder like member 85, which, as most clearly shown in Fig. 8, extends into close proximity to the roller 6, which in this case, as in the form of my invention shown in Fig. 3, is oscillated axially by the means shown in Fig. 4 and shown partially in Fig. 9.

In order to insure the entrance of the cakes or other articles between the several partition members, 79, 80, I swing the rudder like members 85 in opposition to the movements of oscillation of the roller 6; that is to say, as the rudder like members 85 swing together in one direction, the roller 6 is moved axially in the opposite direction, and this alternation of movement is continued throughout the operation.

In order so to move the rudder like members 85, any suitable means may be provided. Herein for the purpose, I have provided the following mechanism to which my invention is in no wise limited. Upstanding from each of the rudder like members 85 is a post or rod 86 taking into any one of the notches 87 in a right angled bar 88 adapted to be reciprocated from the cam 18' similar in construction to the cam 18 shown in Fig. 4. The rod or bar 88 is supported in suitable guide ways in brackets, one of which is indicated at 89, and to the outer end of said rod or bar 88 is pivotally secured at 90 a lever 91 itself pivoted at 92 upon a bracket 93 extending from the bracket 89 or forming a part thereof. The lower end of said lever 91 is formed as a yoke 93 embracing the cam 18' and having pins riding in a groove 94 thereof, so that upon the reciprocation of a cam 18' and the shaft 14 carrying the same, the rod or bar 88 is reciprocated. Obviously the swing of the rudder like members 85 may be varied by positioning the posts 86 in different openings 87.

In order to prevent escape of the post 86 from the notches 87 I have provided a cover like member 95 hinged to the bar or rod 88 at one or more points, as indicated at 96. A latch 97 is preferably provided, it being pivoted upon a pin 98 so that it may swing laterally from a position overlying the cover, as indicated in Fig. 7 to a position that will permit the said cover 95 to be swung upwardly, thereby permitting the post 86 to be removed from the notches 87.

Having thus described one illustrative embodiment of my invention, I desire it to be understood that although specific terms are employed, they are used in a generic and descriptive sense and not for purposes of limitation, the scope of the invention being set forth in the following claims.

Claims—

1. In mechanism for conveying and stacking disk-like articles, the combination of stacking means for said articles, means to convey said articles to said stacking means and including means having a forward feeding movement to impart a movement of onward travel to said articles and means to impart a to and fro movement to a portion at least of such feeding means, thereby to impart lateral movement to said articles to facilitate their delivery to said stacking means.

2. In mechanism for conveying and stacking disk-like articles, the combination of stacking means for said articles, and means to convey said articles to said stacking means and including means having a forward feeding movement to impart a movement of onward travel to said articles, said means having a to and fro transverse movement at the entrance to said stacking means to facilitate the delivery of said articles to said stacking means.

3. In mechanism for conveying and stacking disk-like articles, the combination of stacking means for said articles having a plurality of stackways, means to position said articles upright in said stackways, and means to convey articles to said stacking means and including feeding means to impart an onward movement of travel to the articles and also a to and fro transverse movement to a portion at least of said feeding means to facilitate the delivery of said articles to said stackways.

4. In mechanism for conveying and stacking disk-like articles, the combination of stacking means for said articles, a series of rolls to convey said articles to said stacking means, means to impart rotation in one direction to said rolls, and means to impart oscillating movement to one or more of said rolls.

5. In mechanism for conveying and stacking disk-like articles, the combination of stacking means for said articles, a series of rolls to convey said articles to said stacking means, means to impart rotation in one direction to said rolls, means to impart to and fro axial movement to one or more of said rolls to facilitate delivery of the articles to said stacking means.

6. In mechanism for conveying and stacking disk-like articles, the combination of stacking means for said articles, a series of rolls to convey said articles to said stacking means, means to impart rotation in one direction to said rolls, and means to impart to and fro axial movement to the last of said series of rolls.

7. In mechanism for conveying and stacking disk-like articles, the combination of stacking means for said articles, having one or more stackways, star-wheel-like means having spaced projections adapted to enter into said stackways and to receive the articles between said projections and to turn them into and deliver them in upright edgewise position for onward travel in said stackway or stackways.

8. In mechanism for conveying and stacking disk-like articles, the combination of stacking means for said articles including one or more stackways, a transverse shaft having circumferentially arranged, spaced projections and having concentric movement only about said shaft to enter said stackway or stackways and to receive the articles substantially flatwise between said projections and to turn them into and deliver them in upright edgewise position for onward travel therein.

9. In mechanism for conveying and stacking disk-like articles, the combination of stacking means for said articles having one or more stackways, a transverse shaft having disks thereon each having spaced projections adapted to enter into said stackway or stackways and to receive the articles substantially flatwise between said projections and to turn them into and deliver said articles in upright edgewise position for onward travel therein.

10. In mechanism for conveying and stacking disk-like articles, the combination of stacking means for said articles having one or more stackways, a grid at the entrance portion of said stackway or stackways, rotary means having prolonged spaced projections adapted to enter the openings in said grid so as to receive articles substantially flatwise between said projections and to turn them into and deliver them in upright edgewise position for onward travel in said stackway or stackways.

11. In mechanism for conveying and stacking disk-like articles, the combination of stacking means for said articles having a stackway or stackways, a transverse shaft having a plurality of star wheels thereon, and an inclined grid through which the projections of said star wheels enter the stackway or stackways so as to receive the articles substantially flatwise between said projections and turn them into and deliver them in upright, edgewise position for onward travel in said stackway or stackways.

12. In mechanism for conveying and stacking disk-like articles, the combination of stacking means for said articles having a plurality of stackways provided at their entrance with a longitudinally slotted grid, a transverse shaft below said grid, star wheel like disks upon said shaft adapted to enter the slots of said grid to receive the articles substantially flatwise between said projections and to turn them into and deliver them in upright edgewise position along said stackways.

13. In mechanism for conveying and stacking disk-like articles, the combination of stackways having longitudinally extending partitions, a series of levers extending transversely of said mechanism and connecting said partitions for varying the width of all of said stackways.

14. In mechanism for conveying and stacking disk-like articles, the combination of stackways having a bottom belt or apron and longitudinally spaced partitions, star wheel-like disks to receive said articles substantially flatwise, to turn them into upright position and to feed them to said bottom belt, and means to shift said partitions toward and from each other to vary the width of the stackways.

15. In mechanism for conveying and stacking disk-like articles, the combination of stackways having a bottom belt or apron and longitudinally spaced partitions, and lever means connecting said partitions to adjust them toward or from each other to vary the width of said stackways.

16. In mechanism for conveying and stacking disk-like articles, the combination of stackways having a bottom belt or apron and longitudinally spaced partitions, and lazytong means connecting said partitions and adapted when moved to vary the width of all the stackways.

17. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, and means having projections adapted to enter through the bottom of said stackways to position the articles edgewise and to impart an onward movement of travel thereto.

18. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, a shaft extending transversely of the mechanism, and spaced means upon said shaft adapted to enter and to withdraw from said stackways, so as to receive the articles to position them edgewise and to impart an onward movement of travel thereto in said edgewise position.

19. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, a shaft extending transversely of the mechanism, a series of disks thereon having circumferentially arranged, spaced projections adapted to enter and to withdraw from the bottom of the stackways, so as to receive articles between them to position them upright and to impart an onward movement of travel thereto.

20. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, means having projections adapted to enter through the bottom of said stackways to position the articles edgewise and to impart an onward movement of travel thereto, and means for simultaneously changing the width of the stackways.

21. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, a shaft extending transversely of the mechanism, and spaced means upon said shaft adapted to enter and to withdraw from said stackways, so as to receive the articles to position them edgewise and to impart an onward movement of travel thereto in said edgewise position, and means for simultaneously changing the width of the stackways.

22. In mechanism for conveying and stacking disk-like articles, the combination of a series of closely spaced rolls for imparting onward movement to the articles, means to oscillate transversely one or more of the last rolls of the series, a series of stackways having longitudinally extending partitions between which the rolls are adapted to deliver the articles, a shaft extending transversely of the mechanism, a series of disks thereon having circumferentially arranged, spaced projections adapted to enter and to withdraw from the bottom of the stackways, so as to receive articles between them to position them upright and to impart an onward movement of travel thereto, and means for simultaneously changing the width of the stackways.

23. In mechanism for conveying and stacking disk-like articles, the combination of stacking means for said articles including a series of stackways, a series of forwardly rotated rolls to deliver the articles to said stackways, one or more of said rolls having a fixed portion and a hollow portion slidable axially thereon.

24. In mechanism for conveying and stacking disk-like articles, the combination of stacking means for said articles including a series of stackways, a series of forwardly rotated rolls to deliver the articles to said stackways, one or more of said rolls having a fixed stud at one end, a hollow shaft portion received on said stud, and means secured to said hollow portion and adapted to receive to and fro movement of oscillation.

25. In mechanism for conveying and stacking disk-like articles, the combination of stacking means for said articles having a plurality of stack ways, means to position said articles upright in said stackways, and means to convey articles to said stacking means, including a series of projections, rudder like members attached to the entrance end of said partitions, means to oscillate said rudder like members, a series of rolls for conveying the articles to said rudder like members, and means to oscillate one of said rolls in opposite phase to the oscillations of the rudder like members.

26. In mechanism for conveying and stacking disk-like articles, the combination of stacking means for said articles, having one or more stackways, feeding means to impart a movement of onward travel to said articles in a flatwise position, rotary means having spaced projections to receive said articles between them, said rotary means being so mounted that the spaced projections have receiving position substantially at the discharge end of said feeding means, and to turn them into upright edgewise position and to deliver them in that position to the said stacking means.

In testimony whereof, I have signed my name to this specification.

EDWARD E. LAWRENCE.